E. T. YOUNG.
INTERNAL COMBUSTION ENGINE.
APPLICATION FILED DEC. 13, 1906.
1,073,553.
Patented Sept. 16, 1913.
3 SHEETS—SHEET 3.
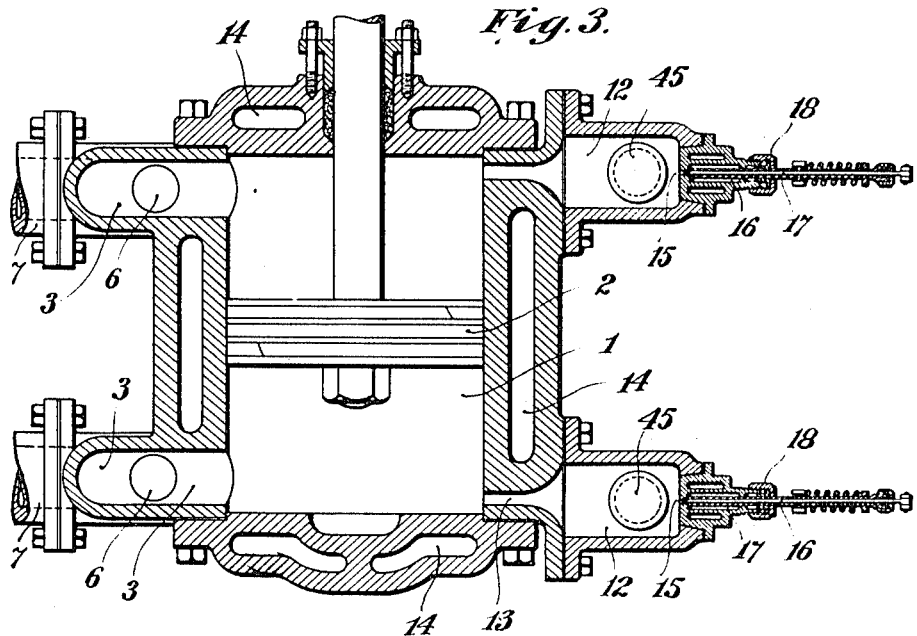
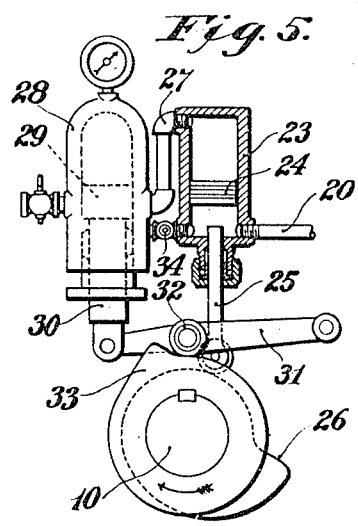
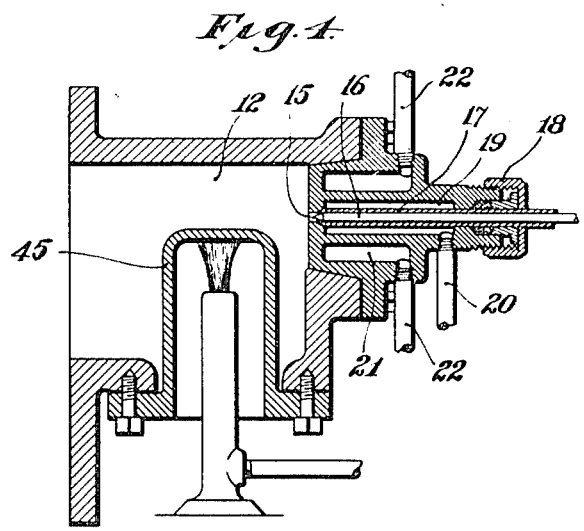
Witnesses:
Inventor:

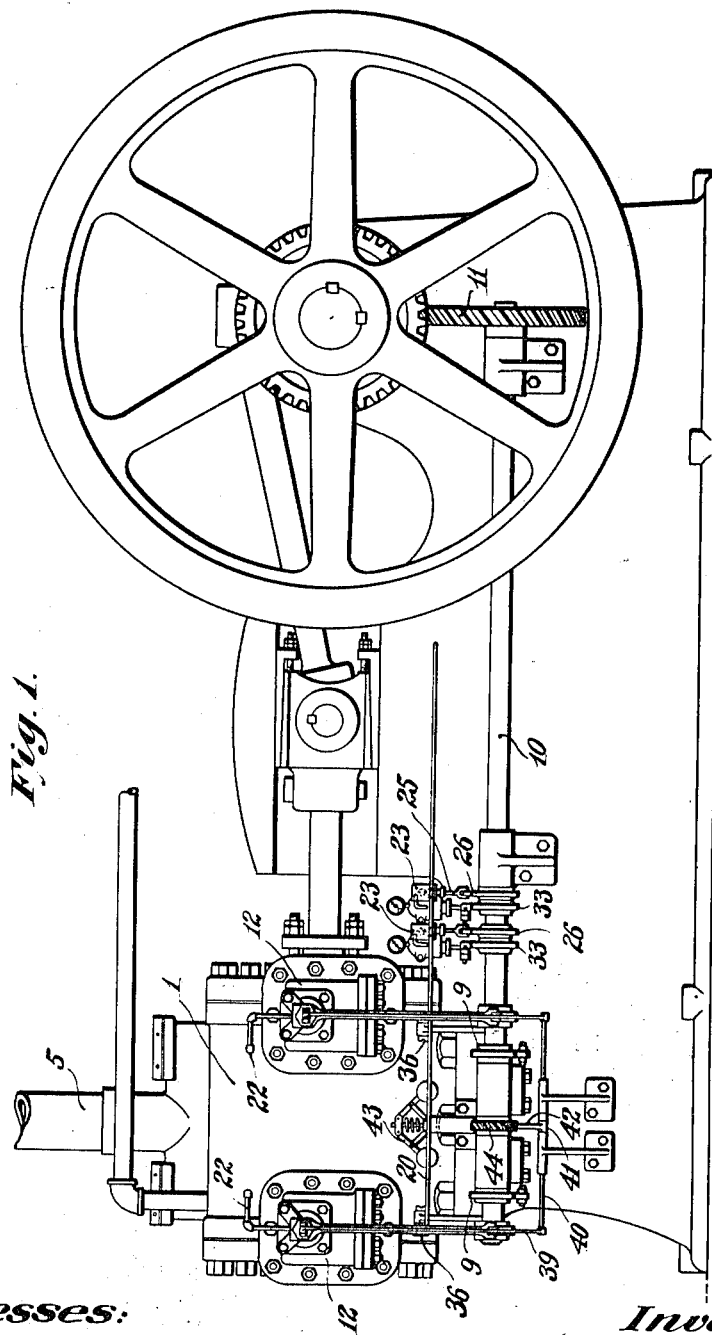

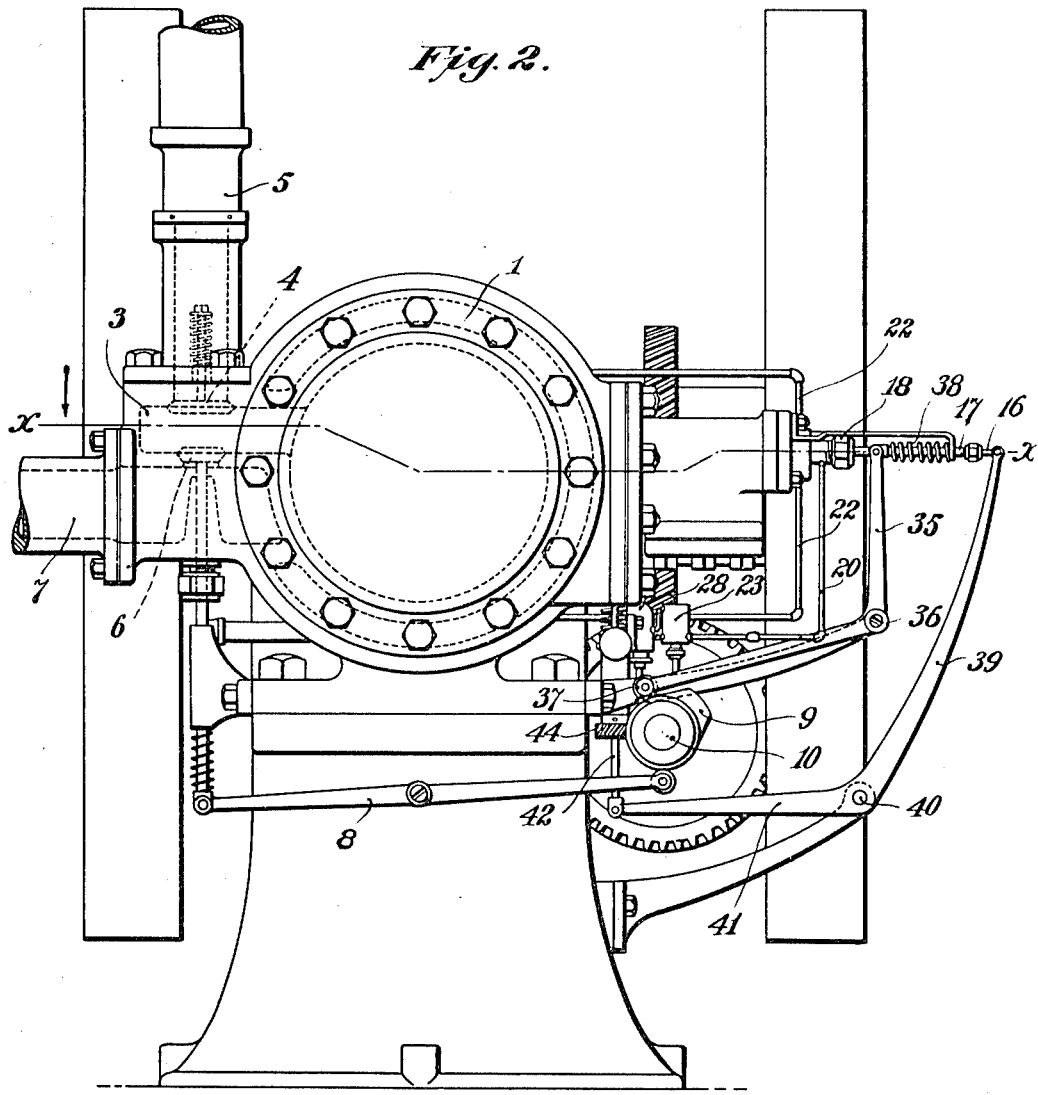

UNITED STATES PATENT OFFICE.

EDWARD T. YOUNG, OF BOSTON, MASSACHUSETTS, ASSIGNOR OF ONE-HALF TO EDWARD E. BADGER, OF HYDE PARK, MASSACHUSETTS.

INTERNAL-COMBUSTION ENGINE.

1,073,553.

Specification of Letters Patent.

Patented Sept. 16, 1913.

Application filed December 12, 1906. Serial No. 347,617.

*To all whom it may concern:*

Be it known that I, EDWARD T. YOUNG, a citizen of the United States, residing at Boston, in the county of Suffolk and State of Massachusetts, have invented certain new and useful Improvements in Internal-Combustion Engines; and I do hereby declare the following to be a full, clear, and exact description of the invention, such as will enable others skilled in the art to which it appertains to make and use the same.

The present invention relates particularly to internal-combustion engines for operating with oil or other liquid fuel, although it is not limited, in its broadest application, to engines of this type, and the object of the invention is to produce an engine in which a high degree of economy and efficiency may be secured without the use of excessive working pressure, together with the complete combustion of the fuel—this last advantage being particularly of value in the use of oil as fuel, which has hitherto involved certain disadvantages which the present invention avoids.

A further incidental object of the invention is to secure, in connection with the features above described, the automatic ignition of the fuel without the provision of special devices for this purpose.

This engine is adapted to carry out the mode of operation described and claimed in a pending application filed by the present applicant Serial No. 319,961, for method of supplying energy to an engine, and the principal feature of novelty of the invention by which the advantages above referred to are secured resides in the injection of the fuel, preferably in the form of a fine jet or spray of liquid, into a body of moderately-compressed but highly-heated air, resulting in the immediate vaporization and ignition and the complete combustion of the fuel.

The applicant is aware, that previously, in engines of a well-known type, the fuel has been injected into a body of air of high temperature so as to be spontaneously ignited, but in such engines the necessary temperature is secured by an excessive degree of compression of the air, which entails working pressures so high as to render the engine very expensive and bulky in proportion to the power delivered, and to practically prohibit the construction of engines of the largest powers. In the present invention, on the other hand, the compression is not solely relied upon to heat the air, but the air is compressed into a chamber of which the walls are maintained at a temperature substantially above the usual temperature of the cylinder of an internal-combustion motor, so that by the combined effects of moderate compression, and conduction from the walls of the chamber, the air is heated sufficiently to vaporize and ignite the fuel. The invention, in this aspect, is to be clearly distinguished from engines provided with heated chambers or bodies so located and constructed that the liquid fuel, when introduced, with or without air, is projected against the surface of such heated chamber or body so as to be vaporized and ignited by contact with the hot metal. Such engines are open to the serious objection that the fuel is not completely consumed, since its vaporization in this manner causes the deposition of a hard and refractory form of carbon on the vaporizing surfaces, necessitating the frequent removal of such deposits and involving a loss in economy equal to the heat value of the carbon so deposited.

In the preferred form of the present invention the fuel-injecting devices are so located and constructed as to project a fine stream of liquid fuel into a body of heated air of such depth that the fuel is entirely vaporized and consumed before it can come in contact with any surface.

In engines of the type last above referred to it is usual to inject the fuel either previous to the time of combustion or almost instantaneously at the time of combustion, the ignition being completed substantially at the beginning of the working stroke, so that the charge operates with an initially high but rapidly falling pressure.

In the preferred form of the present invention the fuel is not fully introduced at or before the commencement of the working stroke, but is introduced gradually during a substantial portion of the working stroke, so as to maintain during such period a substantially uniform working pressure, thereby securing high efficiency without excessive maximum pressure and temperature. The inventor is aware that this mode of fuel introduced has been practised in engines of the type referred to, but it is new, so far as he is informed, to introduce the fuel in this way in an engine working at moderate pressure and introducing the fuel into a body of air in which it is gradually consumed.

In order that the full advantages of this type of engine may be secured it is necessary not only to continue the injection of fuel during part of the working stroke, but also to insure a rate of flow adequate to maintain a constant pressure.

To this end the invention comprises the use of fuel-injecting means acting to inject the fuel with increasing velocity to compensate for the increasing speed of the piston, so that a constant pressure is maintained under an increasing rate of expansion.

Other objects and features of the invention, relating more particularly to the details of construction and operation, will be set forth in the description of the illustrated embodiment of the invention.

The drawings represent more or less diagrammatically an engine embodying the present invention, Figure 1 being a side elevation, Fig. 2 an end elevation, Fig. 3 a horizontal section through the cylinder and combustion chambers, Fig. 4 a vertical sectional detail view of one combustion chamber, and Fig. 5 a detail elevation of the fuel pump.

The illustrated embodiment of the invention is an engine of the double acting type having a cylinder 1 and a piston 2 connected with the engine shaft in the ordinary manner. The piston rod passes through a stuffing box so as to form an expansion chamber in each end of the cylinder as is usual in double acting engines. Each end of the cylinder communicates with a valve chamber 3 provided with an air inlet valve 4 of the automatic, suction-operated type, air being supplied through an inlet pipe 5 communicating with the atmosphere. Each valve chamber is provided also with an exhaust valve 6 communicating with an exhaust passage 7. The exhaust valves are raised at proper times by means of levers 8 pivoted on the frame of the engine, and carrying cam rolls engaging exhaust cams 9 on the cam shaft 10 of the engine. The cam shaft is driven in the usual manner by skew gears 11 (see Fig. 1) arranged to rotate the cam shaft at one-half the speed of the engine shaft. The vaporization and combustion of the liquid fuel with which the engine is operated occurs in the combustion chambers 12 communicating through narrow passages 13 with the ends of the cylinder. The cylinder is provided with water jackets 14 to maintain a moderate working temperature therein, but the combustion chambers are not provided with water jackets or other cooling means, and their form is such that they acquire and maintain during the operation of the engine a temperature substantially higher than that of the cylinder.

The fuel oil is injected into the combustion chambers 12 through fuel inlet ports 15. These ports are controlled by governing valves 16 and timing valves 17. The former are provided with tapered extremities as shown in Fig. 4, by which the effective area of the fuel inlet ports may be varied, while the timing valves 17, which are disposed annularly about the governing valves, move independently therefrom, and serve either to open or to entirely close the communication between the inlet ports and the fuel chambers 19 surrounding the valves. The valve stems pass outward through the stuffing boxes 18, and are connected with actuating mechanism hereinafter described. The fuel chambers 19 are supplied with fuel through pipes 20 connecting them with the fuel pumps. To prevent over-heating of the fuel valves or premature vaporization of the fuel in the chambers 19, the latter are surrounded by water jackets 21 communicating through pipes 22 with the water jackets of the cylinder.

One of the fuel pumps is shown particularly in Fig. 5. The pump cylinder 23 contains a free piston 24 and a plunger 25 carrying a cam roll engaging a cam 26 on the cam shaft 10. The pump cylinder communicates through a pipe 27 with a pressure chamber 28 partly filled with air or other elastic gas, and containing a body of liquid 29 which also fills both the pipe 27 and the space in the pump cylinder about the piston 24. A plunger 30 in the lower end of the pressure chamber 28 is connected with a cam lever 31 carrying a cam roll 32 engaging a cam 33 on the cam shaft. The rotation of the cam shaft 10 and cam 26 causes the plunger 25 to lift the piston 24 periodically to a fixed point near the top of the pump cylinder, and then to retreat quickly from the piston, the latter movement occurring at or before the time of injection of fuel into the combustion chamber. Upon the retreat of the plunger 25 the piston is controlled by the pressure of the liquid 29 communicated through the pipe 27, this pressure being due to the compression of the air in the upper part of the pressure chamber 28. Consequently upon the opening of the timing valve 17 to admit fuel into the combustion chamber, the piston 24 is at once forced downward by the elastic expansion of the air, and this movement continues until the timing valve is closed, the amplitude of movement of the plunger 25 being such as to permit a maximum stroke of the free piston greater than the maximum requirement in running the engine under full power. Owing to this arrangement the pump is always in condition to supply whatever amount of fuel is admitted to the combustion chamber through the fuel valves at predetermined pressure, and the construction is such that leakage of fuel past the piston 24 or the plunger 25, unless great in amount, will not affect the operation of the device, since it is compensated for by the expansion of the air in the pressure chamber.

The function of the plunger 30 in the pressure chamber is to control the pressure therein during the injection of fuel. As the air in the pressure chamber expands this pressure becomes less, so that in the absence of such a device the pressure at which the fuel is injected would decrease during the period of injection. It is desirable on the contrary, in order to maintain a uniform working pressure during the portion of the working stroke of the piston in which the fuel is injected, to increase rather than to decrease the pressure of fuel injection, so that as the piston velocity increases during the working stroke, the rate of fuel injection may increase commensurately. This control of the pressure is effected by so forming the cam 33 that during the time of fuel injection which in the illustrated embodiment of the invention occupies substantially 35° of rotation of the crank shaft the plunger 30 is rapidly raised so as to increase the pressure in the pressure chamber 28 and the pressure upon the piston 29.

The pump cylinder 23 is supplied with the fuel oil from any suitable source of supply through a check valve 34 which permits the entrance of the oil upon the raising of the piston 24.

The means for controlling the fuel valves 16 and 17 are shown particularly in Figs. 1 and 2. The timing valves 17 are pivotally connected with bell crank levers 35 journaled at 36 on the bracket or arm secured to the frame of the engine, the bell crank levers at their lower ends carrying cam rolls 37 engaging cams on the cam shaft 10, the cams being timed to open the timing valves substantially at the beginning of the working stroke of the piston, and to release them after about 35° of rotation of the crank shaft. The timing valves are closed by compression springs 38 (Fig. 2). The governing valves are connected to the bent levers 39 on a rock shaft 40 journaled on the bracket secured to the base of the engine, the horizontal arm 41 of said levers being connected with a vertical stem 42 which is connected with a governor 43 of ordinary form. The governor is rotated by skew gears 44 from the cam shaft 10. By this arrangement the governing valves are opened more or less, according to the speed of the engine.

During the normal operation of the engine the heat of combustion is sufficient to maintain the combustion chambers at the proper temperature, but special devices are necessary in starting the engine when the combustion chambers are cold, and for this purpose each combustion chamber is provided with an inwardly extending thimble-shaped projection 45 which is hollow and may be heated from without by any suitable burner.

The operation of this engine is as follows: Each end of the cylinder, with its connected devices, operates in conjunction with the piston as a 4-cycle engine, so that during each two rotations of the crank shaft there are two contiguous working strokes of the piston and two succeeding contiguous idle strokes. Supposing the piston to be in its inward position, upon its first out-stroke air is drawn through the inlet valve into the cylinder. Upon the succeeding in-stroke of the piston this air is compressed, a large part of it being forced into the combustion chamber, since the piston is arranged to have only a slight clearance from the cylinder head. This compression of the air raises the temperature somewhat, but as only a moderate pressure of piston compression is used, the air in the cylinder is not heated to a high degree. The air in the combustion chamber, however, receives a substantial accession of heat from the hot walls thereof sufficient to cause vaporization and ignition of the fuel when the fuel is injected. Upon the completion of this compression stroke the timing valve is opened, and the pump operates to inject a stream or spray of liquid fuel into the combustion chamber. The combustion chamber is so formed that the fuel must traverse a considerable space before coming in contact with any of the containing walls, and consequently the fuel is entirely vaporized and drawn within the body of air before it can come in contact with any surface, which results in complete combustion of the fuel without any deposit or residue. This injection of fuel commences at the end of the compression stroke, and lasts during a substantial portion of the succeeding out-stroke or working stroke of the piston. This is a substantial improvement over engines in which the entire charge is injected at once at the beginning of the working stroke, for in such engines the pressure suddenly rises to an inconveniently high point, and then as suddenly falls during the working stroke, whereas in the present invention, without the use of a moderately high working pressure, the working pressure is maintained constant and at a maximum during a substantial part of the working stroke, falling thereafter as in the ordinary engine.

Where in the claims the term "high temperature" is applied to the combustion chamber, this term is intended to designate a temperature substantially higher than the normal working temperature of the cylinder of an internal combustion engine, or, in other words, a temperature sufficiently high to permit vaporization and spontaneous combustion of the fuel without the excessive compression of the air necessary where compression is depended upon to heat the air sufficiently. In the present invention, while the compression contributes necessarily to some extent to the heating of the air, still this is not essential, as the engine may be arranged by the use of the hot combustion chamber to operate at any compression, however moderate.

The invention is not limited to the details of construction and operation of the illustrated embodiment, but may be embodied in other forms broadly defined in the claims.

Having now described the invention, what is claimed is:

1. An internal combustion engine, having, in combination, a cylinder, a piston, a combustion chamber communicating with the cylinder and maintained at a sufficiently high temperature to heat above the temperature of ignition of the fuel the air which is contained in said chamber under a compression insufficient to heat it to said temperature of ignition, and means for introducing the fuel and increasing the pressure thereon during a substantial portion of the working stroke of the piston as the piston advances whereby the initial pressure in the cylinder will be maintained.

2. An internal combustion engine, having, in combination, a cylinder, a piston, a combustion chamber communicating with the cylinder through a narrow passage and being maintained at a sufficiently high temperature to heat above the temperature of ignition of the fuel the air which is contained in said chamber under a compression insufficient to heat it to said temperature of ignition, and means for introducing fuel and increasing the pressure thereon during a substantial portion of the working stroke of the piston whereby an increasing quantity of fuel is introduced into said chamber as the piston advances.

3. An internal combustion engine, having, in combination, a cylinder, a piston, means for heating above the temperature of ignition of the fuel the air which is under insufficient compression to heat it to such temperature of ignition, comprising means for exerting an increasing pressure upon the fuel during the first portion of the piston stroke whereby the fuel will be introduced into the air so heated in increasing quantities during said first portion of the working stroke of the piston.

4. An internal combustion engine, having, in combination, a cylinder, a piston, an unjacketed combustion chamber communicating with the cylinder and maintained at a sufficiently high temperature to heat above the temperature of ignition of the fuel the air which is contained in said chamber under insufficient compression to heat it to said temperature of ignition, and means for increasing the pressure on the fuel during the first portion of the working stroke of the piston whereby the initial pressure in said chamber will be maintained during said first portion of said stroke.

5. An internal combustion engine, having, in combination, a cylinder, a piston, a combustion chamber communicating with the cylinder and maintained at a sufficiently high temperature to heat above the temperature of ignition of the fuel the air which is contained in said chamber under insufficient compression to heat it to said temperature of ignition, and a hollow inward projection in the combustion chamber arranged to be heated by external heating devices, and means for introducing fuel into said chamber during a substantial portion of the working stroke of the piston, substantially as described.

6. An internal combustion engine having in combination a cylinder, a piston and a pump operable during the first portion of the working stroke of the piston to supply fuel thereto in increasing quantity as the piston advances as set forth.

7. An internal combustion engine having in combination a cylinder, a piston and a pump operable during the first portion of the working stroke of the piston to supply fuel to the engine in increasing quantities as set forth.

8. An internal combustion engine having in combination a cylinder, a piston, and means adapted to increase the pressure upon and thereby to supply fuel in increasing quantities to the engine during the first portion of the working stroke of the piston.

9. An internal combustion engine having in combination a cylinder, a piston, a pump connected to said cylinder to supply fuel thereto in increasing quantities, and means adapted to operate said pump during the first portion of the working stroke of the piston.

10. An internal combustion engine having in combination a cylinder, a piston, a pump connected to said cylinder to supply fuel thereto, and means adapted to operate it during the first portion of the working stroke of the piston with increasing capacity whereby during such portion of the piston stroke the pressure will remain substantially constant in the cylinder.

11. An internal combustion engine, having, in combination, a cylinder, a piston, and a pump for supplying fuel to the engine in increasing quantity as its piston advances, a piston in the pump, and cam-actuated means for moving the piston to make its fuel delivery stroke during a portion of the working stroke of the piston and at such a rate that the pressure within the cylinder shall be maintained substantially constant, substantially as described.

12. An internal combustion engine, having, in combination, a cylinder, a piston, and a pump for supplying fuel to the engine in increasing quantity as its piston advances, said pump comprising a piston, means for moving the piston positively in one direction to a fixed point during the intake stroke of the pump, and independent means for moving the piston yieldingly in the opposite direction a variable distance dependent upon the amount of fuel admitted to the engine, substantially as described.

13. An internal combustion engine, having, in combination, a cylinder, a piston, and a pump for supplying fuel to the engine in increasing quantity as its piston advances, said pump comprising a piston, means for moving the piston positively in one direction to a fixed point during the intake stroke of the pump, and independent means for moving the piston yieldingly in the opposite direction a variable distance, controlled by the fuel itself and according to the amount of fuel admitted to the engine, substantially as described.

14. An internal combustion engine, having in combination, a cylinder, a piston, fuel controlling means for controlling the admission of fuel to the engine, and a pump for supplying fuel to the engine, said pump comprising a piston, and means for moving the piston positively in one direction to a fixed point during the intake stroke of the piston and yieldingly in the opposite direction a distance automatically variable according to the amount of fuel admitted to the engine by the fuel controlling means, substantially as described.

15. An internal combustion engine having in combination a cylinder, a piston and a pump for supplying fuel to the engine, said pump comprising a cylinder, a piston, and means including a pneumatic pressure-containing receptacle connected to said pump cylinder on one side of said piston for actuating the piston to cause it to make its power stroke as described.

16. An internal combustion engine having in combination a cylinder, a piston and a pump for supplying fuel to said engine, said pump comprising a cylinder and a piston and a pneumatic pressure-containing receptacle connected with the pump cylinder, and means for preventing a reduction of pressure in the receptacle due to the movement of said piston.

17. An internal combustion engine, having, in combination, a cylinder, a piston, and a pump for supplying fuel to the engine, the pump comprising a pump cylinder, a piston therein, a pneumatic pressure chamber connected with the pump cylinder, a movable piston for reducing the capacity of the connected cylinder and chamber, and means for actuating said movable piston, substantially as described.

18. An internal combustion engine having in combination a cylinder, a piston and a pump for supplying fuel to the engine, said pump comprising a cylinder, a piston and means for positively moving the piston in one direction to cause it to make its intake stroke, and means for operating the piston in the opposite direction by pneumatic pressure to cause it to make its power stroke, said means comprising a pneumatic pressure receptacle operatively connected to said cylinder, and means for supplying pressure to said receptacle.

19. An internal combustion engine having in combination a cylinder, a piston, a fuel supply pump, and means adapted to actuate said pump during the first portion of the working stroke of said piston, and at a rate proportionate to the increasing speed of said piston whereby fuel in an increasing quantity will be fed to the engine during an appreciable portion of the piston stroke.

20. In an internal combustion engine, the combination with the cylinder, of means to admit a fuel charge into the cylinder during the time that the piston is near its stroke limit and the volume of the combustion chamber is substantially constant, and means to increase the pressure on the fuel whereby the fuel supply will be increased when, on the outward stroke of the piston, the volume of the combustion chamber is substantially increased and the maximum pressure will remain constant during the injection of the fuel.

21. In an internal combustion engine, the combination with the cylinder, of mechanism to admit fuel into the cylinder during the time that the piston is moved from a point near its stroke limit to its stroke limit, and a short distance reciprocally away from its stroke limit, and means for increasing the pressure upon the fuel during the outward movement of the piston whereby the supply of fuel will be increased during the continuance of the movement of the piston in said reciprocal direction and the maximum pressure will remain constant during the injection of the fuel.

22. In an internal combustion engine, the combination with the cylinder, of means to admit a fuel charge when the piston is near the dead point, and means to increase the rate of the fuel supply when the piston moves away from the dead point on the same stroke and thereby substantially increases the volume of the combustion chamber comprising means for increasing the pressure on the fuel, operating simultaneously with the increase of the volume of said combustion chamber.

In testimony whereof I affix my signature, in presence of two witnesses.

EDWARD T. YOUNG.

Witnesses:
 FARNUM F. DORSEY,
 EDWARD E. BADGER.